(12) United States Patent
Pintat

(10) Patent No.: US 9,468,905 B2
(45) Date of Patent: Oct. 18, 2016

(54) COMPOSITION FOR CONTROLLING PRESENCE OF WATER ON AN OUTER SURFACE

(71) Applicant: Benoît Pintat, Zellenberg (FR)

(72) Inventor: Benoît Pintat, Zellenberg (FR)

( * ) Notice: Subject to any disclaimer, the term of this patent is extended or adjusted under 35 U.S.C. 154(b) by 0 days.

(21) Appl. No.: 14/143,061

(22) Filed: Dec. 30, 2013

(65) Prior Publication Data

US 2014/0314499 A1    Oct. 23, 2014

(30) Foreign Application Priority Data

Dec. 28, 2012  (FR) .................................... 12 62909

(51) Int. Cl.
| | |
|---|---|
| B01J 20/00 | (2006.01) |
| B01J 20/28 | (2006.01) |
| B01J 20/18 | (2006.01) |
| B01J 20/32 | (2006.01) |
| C09K 3/18 | (2006.01) |
| E02D 19/00 | (2006.01) |
| E01C 13/02 | (2006.01) |
| E01C 13/08 | (2006.01) |

(52) U.S. Cl.
CPC ......... *B01J 20/28016* (2013.01); *B01J 20/186* (2013.01); *B01J 20/28004* (2013.01); *B01J 20/2805* (2013.01); *B01J 20/3268* (2013.01); *B01J 20/3274* (2013.01); *C09K 3/18* (2013.01); *E01C 13/02* (2013.01); *E01C 13/08* (2013.01); *E01C 13/083* (2013.01); *E02D 19/00* (2013.01)

(58) Field of Classification Search
CPC ... E01C 11/04; E02D 19/00; C02F 2103/001
USPC ................ 405/270; 252/194; 427/314
See application file for complete search history.

(56) References Cited

U.S. PATENT DOCUMENTS

| | | | |
|---|---|---|---|
| 2,277,286 A * | 3/1942 | Bechtner ...................... 405/107 |
| 4,372,876 A | 2/1983 | Kulprathipanja et al. |
| 4,386,012 A | 5/1983 | Kulprathipanja et al. |
| 4,431,456 A | 2/1984 | Kulprathipanja |
| 5,112,665 A * | 5/1992 | Alexander ................... 428/102 |
| 5,538,787 A * | 7/1996 | Nachtman et al. ........... 428/323 |
| 5,897,946 A * | 4/1999 | Nachtman et al. ........... 428/323 |
| 6,386,796 B1 * | 5/2002 | Hull ......................... 405/128.25 |

(Continued)

FOREIGN PATENT DOCUMENTS

| | | |
|---|---|---|
| CN | 101 250 392 A | 8/2008 |
| EP | 0 210 972 A1 | 2/1987 |

(Continued)

OTHER PUBLICATIONS

French Search Report issued in corresponding application No. FR1262909 on Sep. 11, 2013.

(Continued)

*Primary Examiner* — Tara M. Pinnock
(74) *Attorney, Agent, or Firm* — Carter, DeLuca, Farrell & Schmidt, LLP

(57) ABSTRACT

A composition for an outside surface, includes at least a mixture of a microporous mineral of the zeolite type and a salt in order to allow for an adsorption and/or desorption effect, the composition including a permeable film at least partially coating the microporous mineral.

20 Claims, 2 Drawing Sheets

(56) References Cited

U.S. PATENT DOCUMENTS

Figure 1:
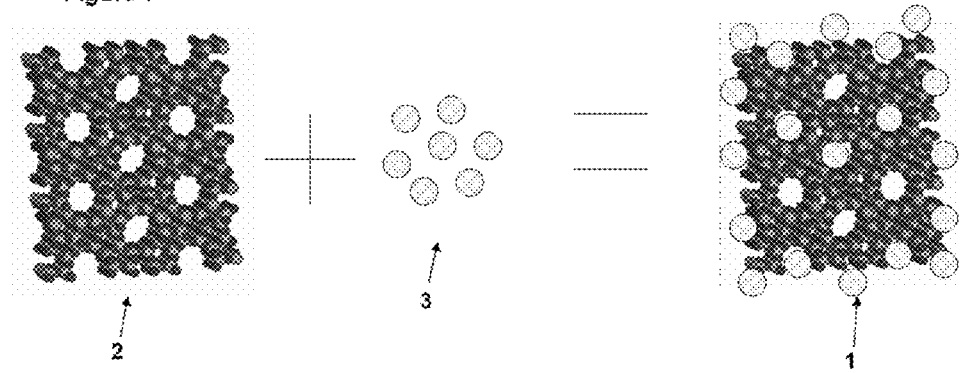

| | | |
|---|---|---|
| 6,413,011 B1* | 7/2002 | Sobczak et al. ............... 404/72 |
| 2003/0087086 A1* | 5/2003 | Koslow et al. ............... 428/323 |
| 2008/0199256 A1* | 8/2008 | McPhillips ............. 405/129.57 |
| 2010/0132559 A1* | 6/2010 | Ishida et al. ........................ 96/5 |
| 2010/0203265 A1* | 8/2010 | Tetrault ................. E01C 13/08 428/17 |
| 2011/0269217 A1* | 11/2011 | Eun et al. ................. 435/253.6 |
| 2012/0329934 A1* | 12/2012 | Bower et al. ................ 524/425 |
| 2013/0263530 A1* | 10/2013 | Shiao et al. ..................... 52/95 |

FOREIGN PATENT DOCUMENTS

| | | |
|---|---|---|
| HU | T50 857 A | 3/1990 |
| JP | S60 195178 A | 10/1985 |
| JP | 2012 188470 A | 10/2012 |

OTHER PUBLICATIONS

European Search Report and Written Opinion issued in corresponding application No. EP 13 30 6812 on Apr. 10, 2014.

* cited by examiner

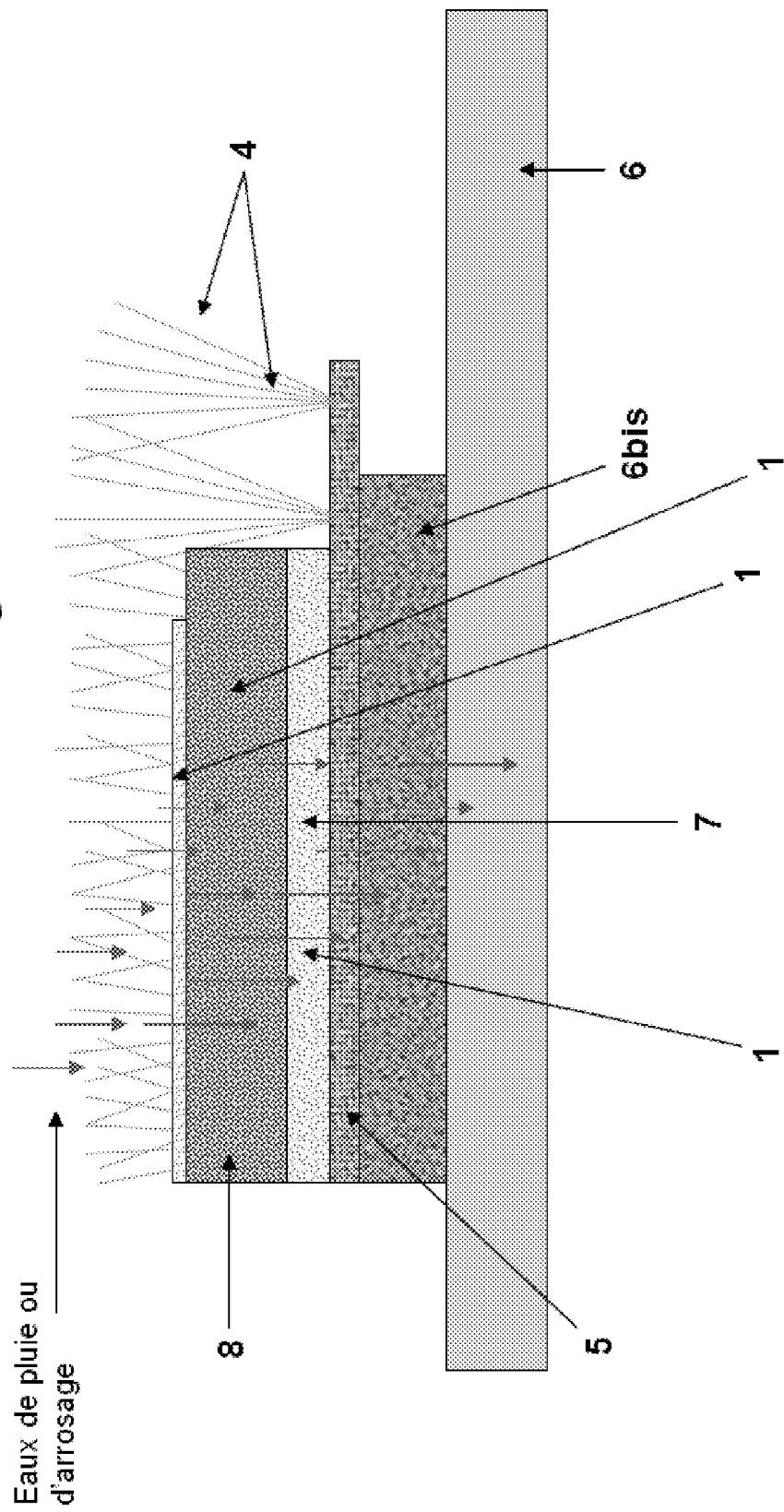

COMPOSITION FOR CONTROLLING PRESENCE OF WATER ON AN OUTER SURFACE

The present invention relates to the domain of compositions that allow for optimizing the resistance of outside surfaces subject to severe heat and recurring bad weather.

On playing fields, the outside surfaces are subject to the constraints of bad weather and temperature variations that lead to more rapid degradation of the surface, or even to problems in upkeep and in maintaining these outside surfaces in the conditions optimal for use.

Two major drawbacks generally arise, one in the cold season and the other in the hot season.

In the cold season, when these outside surfaces are damp, the appearance of frost renders the surfaces hard and slippery and thus dangerous to use. Similarly, the frost can act as a curb on evacuating the humidity by means of an associated drainage system. In order to compensate for these difficulties, heating systems are currently developed with a view to limiting the risk of frost on these artificial fields and facilitating the elimination of humidity on the surfaces. However, such systems have the disadvantage of imposing an additional cost during the construction and installation of the field surface and considerable consumption of energy.

In the hot season, when these outside surfaces are subject to severe heat, their temperatures can reach nearly 70° C., even though the temperature of the air is 34° C., rendering the use of these surfaces extremely difficult. That is why it is common to refresh said surfaces, trodden-down earth, lawn, or artificial lawn, by regular watering in order to limit too high a rise in the surface temperature and to keep it in a range optimal for use.

The present invention has the goal of compensating for these drawbacks by proposing a composition that allows the use of different types of outside surfaces to optimize their use within the framework of bad weather and high temperatures.

The invention thus has as its object a composition for an outside surface intended to regulate the presence of water on that surface, characterized in that said composition includes at least a mixture of a microporous mineral of the zeolite type and a salt, in order to allow for an adsorption and/or desorption effect, this composition including at least partially coating the microporous mineral of the zeolite type with a permeable film.

The invention also concerns uses adapted to a composition according to the invention for specific outside surfaces.

The invention also concerns a technique for producing a composition according to the invention, characterized in that the technique includes mixing a microporous mineral of the zeolite type and a salt with at least:
- a step of adding a specified quantity of solvent,
- a step of diluting the salt in the solvent to obtain a saline solution,
- a step of saline-solution adsorption and/or absorption by the microporous mineral,
- a step of eliminating the adsorbed and/or absorbed solvent, leaving the microporous mineral loaded with salt,
- a step of coating the microporous mineral loaded with salt at least partially with a permeable film.

The invention even concerns a composition for renewing the adsorption of salt by the microporous mineral of a composition for an outside surface according to the invention, characterized in that this composition includes a quantity of a coating element of 70% at most of the total mass of the composition and a quantity of salt of 30% at most of the total mass of the composition.

Figure 2:
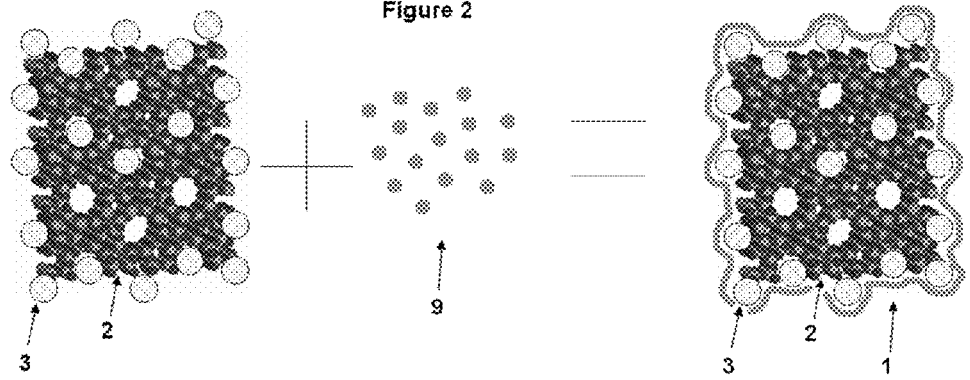

The invention will be better understood thanks to the following description, which relates to a preferred embodiment, given by way of a non-limiting example and explained with reference to the appended schematic sketches, wherein:

FIG. 1 is a schematic representation of a granule of microporous mineral that incorporates a salt, FIG. 2 is a schematic representation of a granule of microporous mineral that incorporates a salt and is coated with a permeable film, FIG. 3 is a cross-section of an example of artificial lawn and its drainage system.

In the present document, the expression "outside surface" designates a surface that could withstand the constraints associated with humidity, bad weather, cold, or severe summer heat. This surface or field can be a roadway, a sidewalk, staircase steps, a parking place, or, again, a playing field, such as, for example, natural turf, a synthetic lawn, a surface of trodden earth, or a riding ring.

The present invention relates to a composition 1 for an outside surface intended to regulate the presence of water on that surface, characterized in that this composition 1 includes at least a mixture of a microporous mineral of the zeolite type 2 and a salt 3 in order to allow for an adsorption and/or desorption effect, said composition 1 including at least partially coating the microporous mineral 2 of the zeolite type with a permeable film.

According to the unique embodiment of the invention, the microporous mineral is a zeolite 2, which can be of the chabazite and/or clinoptinolite type. Similarly, it should be understood that the zeolite 2 used within the scope of the invention is a zeolite 2 that can be natural or obtained by synthesis.

According to another embodiment of the invention, the microporous mineral 2 exhibits a grain size that is between 0.5 and 1.5 millimeters.

According to a preferred embodiment of the invention, the salt 3 of the mixture is incorporated into the microporous mineral 2 such that said mineral is charged ionically with the salt 3 of the mixture. This incorporation also includes coating the microporous mineral 2 with an ionic charge on its outer surface. It should be noted that although the salt 3 used is traditionally NaCl, it can be replaced by any salt that can exhibit equivalent properties. Thus, this salt can be formed by one or a plurality of inorganic cations from the group of alkali metals or alkaline earth metals and/or by one or a plurality of inorganic anions from a group including at least hydroxides, chlorides, and sulfates. Alternatively, the salt can be organic and composed of one or a plurality of salts from a group including at least dicarboxylic acids, formic acids, and acetic acids.

Said incorporation of the salt into the microporous mineral 2 allows a synergy to operate between the properties of adsorption, absorption, and progressive restitution of the microporous mineral 2, on the one hand and, on the other hand, the properties of lowering the solidification temperature of the water. Actually, in the presence of humidity, the microporous mineral 2 is in a position to adsorb and/or absorb this humidity in order to prevent, on the one hand, the surface formation of a layer of slippery frost, in the case of a negative temperature, and on the other hand, the agglomeration of the substrate elements.

The risk of a layer of frost forming is also reduced thanks to the progressive release, if humidity is present, of the salt incorporated into the microporous mineral 2. The release of the salt 3 by the microporous mineral 2 in the presence of humidity allows the formation of a saline solution whose solidification temperature is lower than that of water. As this saline solution presents a risk of more reduced solidification during a drop in temperature, it can then be evacuated more easily by means of an appropriate drainage system 6, 6 bis.

Also, further, another property of the microporous mineral 2 is its incompressibility. This property allows the risk of the clumping of granules of said microporous mineral to be limited at negative temperatures. Thus, the incompressibility of granulates of this mineral 2 guarantees the presence of interstices between said granulates and ensures the presence and maintenance of spaces that make flow and evacuation of water, humidity, or salinated water possible. Such a property could not be exploited with certain other minerals such as sand alone, which exhibits the drawback of clumping more readily in the presence of frost and removes the possibility of evacuating the humidity toward a drainage system 6, 6 bis below the surface of the field.

In the context of using the microporous mineral 2 on outside surfaces subject to severe heat, the microporous mineral 2, loaded with salt 3 and in water, allows a progressive release of the water and the maintenance of relative humidity at the surface of said field. Thus, on a surface subject to severe heat, when it is refreshed by watering, the microporous mineral 2 loaded with salt adsorbs and/or absorbs the water and then progressively releases those water molecules by desorption. This progressive release of the water by the microporous mineral 2 avoids rapid evaporation of the water after watering the surface and allows a lower temperature to be maintained at the level of the field surface compared to the ambient temperature. Said microporous mineral 2 loaded with salt 3 thus allows the amount of watering usually necessary to refresh a field surface to be reduced.

According to one unique embodiment, this composition 1 is characterized in that the quantity of salt is at least greater than 10% of the total mass of the composition. This quantity is preferentially at least between 10% and 70% of the total mass of the composition and ideally between 10% and 50% of the total mass of the composition. It should be understood that the quantity of salt 3 incorporated into the zeolite 2 is increased in order to improve the effectiveness of the composition of the invention.

According to a preferred but non-limiting embodiment of the invention, the composition according to the invention is characterized in that the quantity of microporous mineral 2 corresponds to 50% of the total mass of composition 1.

Such a composition combining a zeolite 2 with a salt 3 also allows, at identical temperatures, the quantity of salt 3 traditionally necessary to combat the appearance and formation of frost to be cut back, and thus it limits the annoyances associated with a high salt use.

The characteristic of coating the microporous mineral 2 with a permeable film 9 has the purpose of slowing down the release of the salt 3 by the mineral 2, while still allowing adsorption and/or absorption of a water molecule through the coating film 9. This arrangement also allows the phenomenon of desorption and the release of water molecules adsorbed and/or absorbed by mineral 2 to be regulated.

According to a non-limiting characteristic of an embodiment of the invention, the permeable film 9 can also be loaded with salt 3. Such an arrangement then allows, on the one hand, adsorption and/or absorption of a water molecule to be facilitated and the slowing down of the phenomenon of desorption to be optimized, and on the other hand, the loss of the load of salt 3 form the microporous mineral 2 to be limited after several adsorption and/or absorption and desorption operations.

According to a preferred but non-limiting embodiment of the composition 1 of the invention, the coating film 9 is achieved by means of a natural or synthetic oligomer and/or polymer. According to a special feature of this preferred embodiment, the polymer used for the coating film 9 is achieved by means of at least one compound from a list including, in particular, at least starch, dextrin, and rosin.

According to a unique embodiment of the invention, coating the microporous mineral 2 is done by means of a permeable film 9 whose thickness is 500 microns at most, preferentially in the range of 5 and 200 microns, ideally in the range of 10 and 150 microns.

The permeability of the coating to water differs according to the type of coating compound used. Thus, for starch, the permeability is 10 and 10,000 $l/m^2 \cdot hr$, preferentially in the range of 50 and 2000 $l/m^2 \cdot hr$, ideally in the range of 100 and 500 $l/m^2 \cdot hr$.

For dextrin used as a coating material, permeability is in the range of 10 and 25,000 $l/m^2 \cdot hr$, preferentially in the range of 100 and 5000 $l/m^2 \cdot hr$, ideally in the range of 200 and 1500 $l/m^2 \cdot hr$.

In the case of using rosin as a coating material, this permeability is in the range of 10 et 3000 $l/m^2 \cdot hr$, preferentially in the range of 20 and 600 $l/m^2 \cdot hr$, ideally in the range of 50 and 150 $l/m^2 \cdot hr$.

It should be noted that these different permeability values are measured through a coating-compound thickness of 5 cm, without pressure being exerted on the water when measuring the permeability.

The coating of the microporous mineral 2 by a permeable film 9 can be total, that is to say, over the whole of the surface of the microporous mineral 2, or simply partial, that is to say, only on part of the surface of mineral 2. Preferentially, the coating is done over the whole surface of mineral 2 in order to participate in a optimized manner in slowing down the phenomenon of desorption of water, or even of salt 3.

Mixing salt 3 with microporous mineral 2 causes a solvent, for example water, to preferentially occur, allowing the incorporation of the salt 3 onto and into mineral 2. Initially, the solvent allows the salt 3 to dissolve to obtain a saline solution. This saline solution is then adsorbed and/or absorbed by the microporous mineral 2. The adsorbed and/or absorbed water is then eliminated from the microporous mineral 2. This elimination can be done by accelerating the release of the adsorbed and/or absorbed water by the microporous mineral 2 by means of drying, in increasing the ambient temperature and/or ventilating the atmosphere.

The microporous mineral 2 of the invention can be used with regard to surfaces exhibiting some thickness, such as, by way of example and in a non-limiting manner, lawns or turf, natural or artificial. The thickness is, then, obtained between, on the one hand, the base 5 which makes a structure on which is mounted, fastened, at least one bundle 4 of fibers oriented in a direction roughly perpendicular to the plane of base 5 and, on the other hand, the end of the fiber bundles 4. The microporous mineral of the invention disposed on this surface is positioned at base 5 of the surface, retaining humidity at this level by means of adsorption and/or absorption. The microporous mineral 2, charged ionically, thus prevents the humidity from rising to the level of the end of the bundles 4 of fibers to form a layer of slippery frost there.

The technique of producing a composition 1 according to the invention could be summarized in that it comprises the mixing of a microporous mineral 2 and a salt 3 with:
- a step of adding a specified quantity of solvent,
- a step of diluting the salt in the solvent to obtain a saline solution, a step of adsorption and/or absorption of the saline solution by the microporous mineral 2,
- a step of eliminating the adsorbed and/or absorbed solvent, leaving the microporous mineral 2 loaded with salt 3,
- a step of at least partially coating the microporous mineral 2, loaded with salt, with a permeable film 6.

The incorporation of the salt 3 into the microporous mineral 2 can be carried out with at least 2 ml of solvent, such as water, for 37 grams of the mixture of salt 3 and microporous mineral 2. According to the embodiment of the technique, the quantity of solvent can be adapted to fit its evaporation conditions. Indeed, the greater the amount of solvent, the longer will be the time necessary for the elimination step.

A non-limiting embodiment example of composition 1 of the invention consists of mixing, in equivalent proportions, 0.8 gram of salt 3, NaCl, with 3 grams of microporous mineral 2. According to an embodiment example of the invention, for the proportions, the incorporation of the salt 3 into the mineral 2 is carried out with 4 ml of a solvent such as water.

Within the context of using a salt 3 of soda, formic acid, or dicarboxylic acids, this salt represents up to 50% of the total weight of the microporous mineral 2, preferentially 2% to 30% of the total weight of mineral 2, and ideally 5% to 20% of the total weight of mineral 2.

When the microporous mineral 2 incorporating the salt 3 of the invention exhibits a loss of effectiveness, for example after a use that eliminated the salt 3 incorporated in the pores of mineral 2, this mineral 2 can be reloaded or regenerated by spreading the salt 3 or brine, NaCl for example, on the surface where the microporous mineral 2 is disposed. In the presence of humidity, the salt 3 that is spread is made soluble, and the microporous mineral 2 incorporates the salt 3 by adsorption and/or absorption of the saline solution.

According to a unique embodiment, the composition of salt 3 and microporous mineral 2 of the invention is characterized in that it also includes a mixture of elastic granulates. Such granulates are traditionally used for fields of the artificial turf type, and they ensure an improvement in the cushioning capacity of the field when a player falls on it.

According to one embodiment, this mixture of elastic granulates is achieved by means of at least one compound from a list including, in particular, at least a thermoplastic elastomer, a rubber, a cork residue, or a coconut residue.

According to a characteristic of this unique embodiment, the rubber can be composed of styrene-butadiene rubber (SBR) or of ethylene-propylene-diene rubber/copolymer of ethylene-propylene-diene monomers (EPDMs).

According to an alternative embodiment, the composition 1 for an outside surface intended to regulate the presence of water on that surface is characterized in that said composition 1 includes at least a mixture of a microporous mineral of the zeolite type 2 and a salt 3 in order to allow for an adsorption and/or desorption effect, said composition 1 also including a mixture of elastic granulates.

According to an embodiment example of the invention, composition 1 for an outside surface includes a quantity of coating element that is between 0.1% and 60% of the mass of microporous mineral 2 and a quantity of salt between 0.05% and 80% of the mass of microporous mineral 2, preferentially a quantity of coating element that is between 1% and 30% of the mass of microporous mineral 2 and a quantity of salt between 1% and 20% of the mass of microporous mineral 2, and ideally a quantity of coating element that is between 7% and 10% of the mass of microporous mineral 2 and a quantity of salt between 10% and 15% of the mass of microporous mineral 2.

The invention also concerns using the composition of the invention on outside surfaces. Although the composition used is identical, this use can differ according to the type of surface to considered: natural turf, artificial lawn, trodden-down earth field, riding ring, etc. In its implementation for an outside surface of trodden-down earth, use of composition 1 is characterized in that the composition 1 is incorporated into the calcareous underlayer of the trodden-down earth surface. This calcareous layer is traditionally disposed below the surface of red clay.

In the implementation for an outside surface of the riding-ring type, composition 1 is spread or scattered in a homogeneous manner on the sand layer distributed over the ring.

In an implementation for an outside surface of the artificial lawn type, the composition is spread between the fiber bundles 4 of the lawn. According to a unique embodiment, this spreading is carried out following a straightening operation on the fibers in order to facilitate the penetration of composition 1 between the fiber bundles 4. Moreover, once composition 1 has been spread, the fibers are again groomed in order to finish the homogenization of composition 1 between the fiber bundles 4 of the lawn. This usage technique presents the advantage of allowing distribution of the composition on already existing and installed artificial lawns.

In the context of installing a new artificial lawn on an outside surface, composition 1 according to the invention is disposed directly between the fiber bundles 4 of the artificial lawn, the fiber bundles 4 being oriented in a direction roughly perpendicular to the plane of the base 5, achieving a structure for fastening the artificial lawn. The base 5 of the lawn can, if necessary, be adapted to position a drainage system 6, 6 bis below its structure, which allows evacuation of liquid through said base 5. Alternatively, according to another unique embodiment that could be combined with the preceding embodiment, composition 1 according to the invention is incorporated into base 5 of the artificial lawn. This embodiment presents the advantage of carrying out the simultaneous installation of the artificial lawn and the composition of the invention optimizing the resistance of said lawn.

According to another unique embodiment that could be combined with the preceding special feature, composition 1 according to the invention is incorporated into base 5 of the artificial lawn at the ballast layer 7. This embodiment presents the advantage of carrying out a simultaneous installation of the artificial lawn and composition 1 of the invention optimizing the resistance of said lawn. Base 5 of the lawn also incorporates a filler layer 8, which is superposed on the ballast layer 7.

According to a unique embodiment, composition 1 of the invention replaces the sand traditionally used in the ballast layer 7 of artificial lawns.

On a field into which composition 1 of the invention is incorporated, the dispersion of composition 1 is between 10,000 grams/m$^2$ and 30,000 grams/m$^2$. Said composition 1 can, then, represent up to 100% of the ballast layer 7.

In the context of spreading on an existing surface, the dispersion of composition 1 of the invention is then between 5000 grams/m² and 25,000 grams/m², preferentially between 9000 grams/m² and 15,000 grams/m², and ideally between 30% and 70% of the total mass of composition 1.

The invention also concerns a further composition for renewing the adsorption of salt 3 by the microporous mineral 2 of composition 1 for an outside surface according to the invention, characterized in that this further composition includes a quantity of coating element of 90% at most of the total mass of the further composition and a quantity of salt of 90% at most of the total mass of the further composition, preferentially a quantity of coating element 9 that is between 10% and 50% of the total mass of the further composition and a quantity of salt 3 between 10% and 50% of the total mass of the further composition and a quantity of microporous mineral 2 that is between 2% and 20% of the total mass of the further composition, and ideally a quantity of coating element 9 that is between 40 and 50% of the total mass of the further composition and a quantity of salt 3 between 20% and 30% of the total mass of the further composition and a quantity of microporous mineral 2 that is between 10% and 20% of the total mass of the further composition.

According to a characteristic of this further composition for renewing the adsorption of salt 3, the microporous mineral 2 used exhibits a grain size in the range of 5 and 100 microns, ideally less than 50 microns.

Of course, the invention is not limited to the embodiments described and depicted in the appended sketches. Modifications remain possible, in particular from the point of view of the make-up of the various elements or by substituting equivalent techniques, without departing in any way from the protected domain of the invention.

The invention claimed is:

1. A granular composition for an outside surface intended to regulate the presence of water on that surface, the granular composition comprising:
    a microporous zeolite mineral;
    a mixture of elastic granulates;
    a salt; and
    a permeable film at least partially coating the microporous zeolite mineral,
    wherein the granular composition is configured for scattering on an outside surface in a homogenous manner.

2. The granular composition for an outside surface according to claim 1, wherein the permeable film comprises a natural or synthetic oligomer and/or a polymer.

3. The granular composition for an outside surface according to claim 2, wherein the polymer comprises at least one compound selected from the group consisting of starch, dextrin, rosin, and mixtures thereof.

4. The granular composition for an outside surface according to claim 1, wherein the permeable film has a thickness of about 500 microns or less.

5. The granular composition for an outside surface according to claim 1, wherein the permeable film has a permeability between 10 and 25,000 l/m² hr for a film thickness of 5 cm.

6. The granular composition for an outside surface according to claim 1, wherein at least one elastic granulate comprises at least one compound selected from the group consisting of at least a thermoplastic elastomer, a rubber, a cork residue, a coconut residue, and mixtures thereof.

7. The granular composition for an outside surface according to claim 1, wherein the salt of the mixture is in amounts between 10% and 70% of a total mass of the composition.

8. The granular composition for an outside surface according to claim 1, wherein the microporous zeolite mineral corresponds to 50% of a total mass of the composition.

9. A method of forming a granular composition for an outside surface intended to regulate the presence of water on that surface according to claim 1, the method comprising:
    mixing the microporous zeolite mineral, the salt, and the mixture of elastic granulates;
    adding a specified quantity of solvent;
    diluting the salt in the solvent to obtain a saline solution, wherein the saline solution is adsorbed and/or absorbed by the microporous zeolite mineral;
    removing the adsorbed and/or absorbed solvent, leaving the microporous zeolite mineral loaded with salt;
    coating the microporous zeolite mineral loaded with salt at least partially with a permeable film; and
    scattering the granular composition onto the outside surface in a homogenous manner.

10. The granular composition for an outside surface according to claim 1, wherein the salt is selected from the group consisting of chlorides, hydroxides, sulfates, dicarboxylic acids, formic acids, acetic acids, and combinations thereof.

11. The method according to claim 9, wherein the scattering step includes incorporating the composition into a base of an artificial lawn at a base layer.

12. The granular composition for an outside surface according to claim 1, wherein the microporous zeolite mineral has a grain size of about 0.5 mm to about 1.5 mm.

13. The granular composition for an outside surface according to claim 1, wherein the outside surface comprises an artificial lawn having fiber bundles, and wherein the granular composition is configured for scattering between the fiber bundles of the lawn.

14. A method of regulating the presence of water on an outside surface, comprising:
    providing a granular composition including a microporous zeolite mineral, a mixture of elastic granulates, a salt, and a permeable film at least partially coating the microporous zeolite mineral; and
    scattering the granular composition onto the outside surface in a homogenous manner.

15. The method according to claim 14, wherein the outside surface comprises an artificial lawn having fiber bundles and wherein the scattering step includes scattering the composition between the fiber bundles of the artificial lawn.

16. The method according to claim 14, wherein the scattering step includes incorporating the granular composition into a calcareous underlayer of a trodden-down earth surface or incorporating the granular composition into a base of an artificial lawn at a base layer.

17. The method according to claim 14, wherein the scattering step includes scattering the granular composition on a sand layer of a riding-ring type surface.

18. A granular composition, comprising:
    a microporous zeolite mineral;
    a mixture of elastic granulates;
    a salt; and
    a permeable film at least partially coating the microporous zeolite mineral,
    wherein the film coating is present in an amount of about 90% or less of the total mass of the granular composition;
    wherein the salt is present in an amount of 90% or less of the total mass of the composition, wherein the granular composition provides for renewal of the adsorption of salt by the microporous zeolite mineral of the mixture, and wherein the granular composition is configured for scattering on an outside surface in a homogenous manner.

19. The granular composition according to claim 18, wherein the microporous zeolite mineral is present in an amount of 20% or less of the total mass of the granular composition.

20. The granular composition according to claim 18, wherein a grain size of the microporous zeolite mineral is in a range of 5 and 100 microns.

* * * * *